(12) United States Patent
Kuriyama et al.

(10) Patent No.: US 10,910,643 B2
(45) Date of Patent: *Feb. 2, 2021

(54) NONAQUEOUS ELECTROLYTE BATTERY

(71) Applicant: KABUSHIKI KAISHA TOSHIBA, Minato-ku (JP)

(72) Inventors: Hiromichi Kuriyama, Yokkaichi (JP); Hidesato Saruwatari, Kawasaki (JP); Hideki Satake, Kashiwazaki (JP); Dai Yamamoto, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,308

(22) Filed: Jun. 3, 2019

(65) Prior Publication Data

US 2019/0288282 A1 Sep. 19, 2019

Related U.S. Application Data

(63) Continuation of application No. 15/449,443, filed on Mar. 3, 2017, now Pat. No. 10,355,273, which is a
(Continued)

(30) Foreign Application Priority Data

Sep. 10, 2014 (JP) ................................. 2014-184525

(51) Int. Cl.
*H01M 4/485* (2010.01)
*H01M 4/04* (2006.01)
(Continued)

(52) U.S. Cl.
CPC ......... *H01M 4/485* (2013.01); *H01M 4/0416* (2013.01); *H01M 4/131* (2013.01);
(Continued)

(58) Field of Classification Search
CPC ..................................................... H01M 4/485
See application file for complete search history.

(56) References Cited

U.S. PATENT DOCUMENTS

2008/0113264 A1 5/2008 Inagaki et al.
2010/0178570 A1 7/2010 Kozono et al.
(Continued)

FOREIGN PATENT DOCUMENTS

CN 103069620 A 4/2013
JP 2001-240498 9/2001
(Continued)

OTHER PUBLICATIONS

International Search Report dated Dec. 8, 2015 in PCT/JP2015/075755, filed on Sep. 10, 2015 (with English Translation).
(Continued)

*Primary Examiner* — Brian R Ohara
(74) *Attorney, Agent, or Firm* — Oblon, McClelland, Maier & Neustadt, L.L.P.

(57) ABSTRACT

According to an embodiment, a nonaqueous electrolyte battery is provided. The nonaqueous electrolyte includes a negative electrode, a positive electrode and a nonaqueous electrolyte. The negative electrode includes negative electrode active material particles. The negative electrode active material particles include a spinel-type lithium titanate. The negative electrode has such a surface state that a ratio $A_{Li}/A_{Ti}$ of an Li atom abundance ratio $A_{Li}$ to a Ti atom abundance ratio $A_{Ti}$, according to a photoelectron spectroscopic measurement for a surface, is increased at a rate of 0.002 to 0.02 per cycle in a charge-and-discharge cycle test under the predetermined condition.

5 Claims, 4 Drawing Sheets

Related U.S. Application Data continuation of application No. PCT/JP2015/075755, filed on Sep. 10, 2015.

(51) Int. Cl.

| | | |
|---|---|---|
| *H01M 4/131* | (2010.01) | |
| *H01M 4/36* | (2006.01) | |
| *H01M 4/62* | (2006.01) | |
| *H01M 10/04* | (2006.01) | |
| *H01M 10/052* | (2010.01) | |
| *H01M 10/0525* | (2010.01) | |
| *H01M 10/0566* | (2010.01) | |
| *H01M 10/0568* | (2010.01) | |
| *H01M 10/42* | (2006.01) | |
| *H01M 4/1391* | (2010.01) | |
| *H01M 4/02* | (2006.01) | |

(52) U.S. Cl.
CPC ........... *H01M 4/366* (2013.01); *H01M 4/628* (2013.01); *H01M 10/049* (2013.01); *H01M 10/052* (2013.01); *H01M 10/0525* (2013.01); *H01M 10/0566* (2013.01); *H01M 10/0568* (2013.01); *H01M 10/4235* (2013.01); *H01M 4/0404* (2013.01); *H01M 4/1391* (2013.01); *H01M 2004/021* (2013.01)

(56) References Cited

U.S. PATENT DOCUMENTS

| | | | |
|---|---|---|---|
| 2012/0225346 A1 | 9/2012 | Hoshina et al. | |
| 2013/0189584 A1 | 7/2013 | Inagaki et al. | |
| 2013/0316242 A1 | 11/2013 | Matsuno et al. | |
| 2013/0330613 A1* | 12/2013 | Saruwatari | H01M 4/525 429/211 |
| 2014/0141323 A1 | 5/2014 | Saruwatari et al. | |
| 2014/0287285 A1 | 9/2014 | Inagaki et al. | |
| 2015/0079438 A1 | 3/2015 | Inagaki et al. | |

FOREIGN PATENT DOCUMENTS

| | | | |
|---|---|---|---|
| JP | 2008-91326 | 4/2008 | |
| JP | 2008-123787 | 5/2008 | |
| JP | 2009-252421 | 10/2009 | |
| JP | 2010-244818 A | 10/2010 | |
| JP | 2013-26038 | 2/2013 | |
| JP | 2013-41844 | 2/2013 | |
| JP | 2013-58402 | 3/2013 | |
| JP | 2013-149486 | 8/2013 | |
| JP | 2014-209443 | 11/2014 | |
| JP | 2015-60713 | 3/2015 | |
| KR | 10-2012-0100686 A | 9/2012 | |
| WO | WO 2012/111813 A1 | 8/2012 | |
| WO | WO-2012111813 A1 * | 8/2012 | ............ H01M 4/661 |
| WO | WO 2013/137273 A1 | 9/2013 | |

OTHER PUBLICATIONS

Written Opinion dated Dec. 8, 2015 in PCT/JP2015/075755, filed on Sep. 10, 2015.

Shigeki Yamate, et al., "High Temperature Life Performance for Lithium-ion Battery Using Lithium Titanium Oxide Negative Electrode with Electrochemically Formed Surface Film Comprising Organic-Inorganic Binary Constituents" GS Yuasa Technical Report, vol. 6, No. 1, 2009, pp. 13 (with English Translation).

* cited by examiner

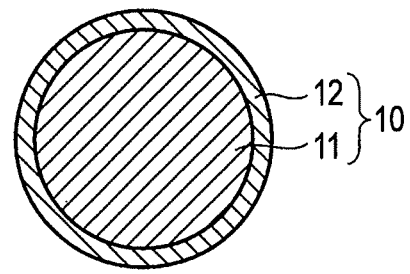
F I G. 1
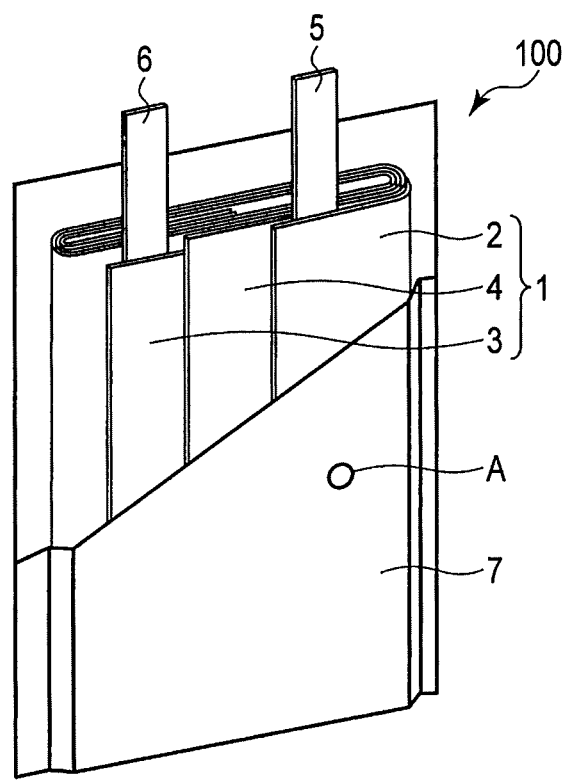
F I G. 2

NONAQUEOUS ELECTROLYTE BATTERY

CROSS-REFERENCE TO RELATED APPLICATIONS

This application is a Continuation Application of U.S. application Ser. No. 15/449,443, filed Mar. 3, 2017, now allowed; which is a Continuation Application of PCT Application No. PCT/JP2015/075755, filed Sep. 10, 2015 and based upon and claiming the benefit of priority from the Japanese Patent Application No. 2014-184525, filed Sep. 10, 2014, the entire contents of all of which are incorporated herein by reference.

FIELD

Embodiments of the present invention relate to a nonaqueous electrolyte battery.

BACKGROUND

Recently, lithium ion secondary batteries using, as a negative electrode active material, a lithium titanate, for example, represented by a chemical formula of $Li_4Ti_5O_{12}$, have been developed. Such a battery has an advantage of higher safety against an internal short-circuit compared to lithium ion secondary batteries using a carbon negative electrode, because it becomes insulator when the lithium titanate is in a discharged state. On the other hand, in the lithium titanate, a reduction reaction, caused by over-insertion of Li, can sometimes be advanced during overcharge. When such a reduction reaction is advanced, a negative electrode potential suddenly drops, and a side-reaction between a negative electrode and a liquid electrolyte suddenly occurs. Such a suddenly occurring side-reaction may cause increase of a temperature in an inside of the battery due to sudden heat generation. For that reason, the over-insertion of Li to the lithium titanate may cause lowered safety of the battery.

BRIEF DESCRIPTION OF THE DRAWINGS

FIG. 1 is a schematic cross-sectional view showing a negative electrode active material particle, which is one example of particles which can be included in a negative electrode in a nonaqueous electrolyte battery according to an embodiment.

FIG. 2 is a partially cutaway perspective view showing a nonaqueous electrolyte battery, which is one example according to the embodiment.

DETAILED DESCRIPTION

Figure 3:
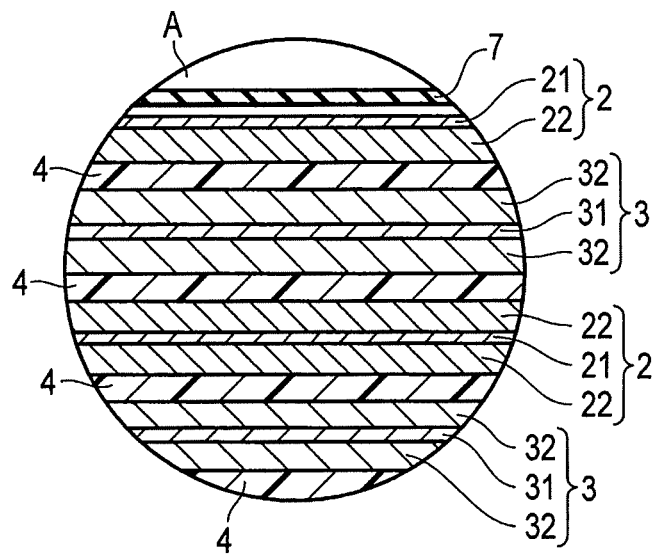
FIG. 3 is an enlarged cross-sectional view showing the part A of the nonaqueous electrolyte battery in FIG. 2.

According to an embodiment, a nonaqueous electrolyte battery is provided. The nonaqueous electrolyte includes a negative electrode, a positive electrode and a nonaqueous electrolyte. The negative electrode includes negative electrode active material particles. The negative electrode active material particles include a spinel-type lithium titanate. The negative electrode has such a surface state that a ratio $A_{Li}/A_{Ti}$ of an Li atom abundance ratio $A_{Li}$ to a Ti atom abundance ratio $A_{Ti}$, obtained according to a photoelectron spectroscopic measurement for a surface, is increased at a rate of 0.002 to 0.02 per cycle in a charge-and-discharge cycle test. The charge-and-discharge cycle test is performed in a 45° C. environment at 2 C rate within a voltage range from a lower limit battery voltage of 1.5±0.1 V to a upper limit battery voltage of 2.7±0.1 V. The Li atom abundance ratio $A_{Li}$ is calculated from a peak derived from a Li 1s-orbital that appears in a binding energy region of 52 eV to 58 eV. The Ti atom abundance ratio $A_{Ti}$ is calculated from a peak derived from a Ti 2p-orbital that appears in a binding energy region of 455 eV to 462 eV.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

EMBODIMENTS

According to an embodiment, a nonaqueous electrolyte battery is provided. The nonaqueous electrolyte includes a negative electrode, a positive electrode and a nonaqueous electrolyte. The negative electrode includes negative electrode active material particles. The negative electrode active material particles include a spinel-type lithium titanate. The negative electrode has such a surface state that a ratio $A_{Li}/A_{Ti}$ of an Li atom abundance ratio $A_{Li}$ to a Ti atom abundance ratio $A_{Ti}$, obtained according to a photoelectron spectroscopic measurement for a surface, is increased at a rate of 0.002 to 0.02 per cycle in a charge-and-discharge cycle test. The charge-and-discharge cycle test is performed in a 45° C. environment at 2 C rate within a voltage range from a lower limit battery voltage of 1.5±0.1 V to a upper limit battery voltage of 2.7±0.1 V.

Here, the Li atom abundance ratio $A_{Li}$ is calculated from a peak derived from a Li 1s-orbital that appears in a binding energy region of 52 eV to 58 eV in the photoelectron spectrum obtained according to the photoelectron spectroscopic measurement for the negative electrode surface. The Ti atom abundance ratio $A_{Ti}$ is calculated from a peak derived from a Ti 2p-orbital that appears in a binding energy region of 455 eV to 462 eV in the photoelectron spectrum obtained according to a photoelectron spectroscopic measurement for the negative electrode surface.

The negative electrode has such a surface state that the ratio $A_{Li}/A_{Ti}$ is increased at a rate of 0.002 or more per cycle in the charge-and-discharge cycle test, and allows the Li concentration on the surface of the negative electrode active material particles to be increased. The negative electrode active material particles can suppress the over-insertion of Li into the inside of the active material during the overcharge, owing to the high Li concentration on the surface. When the increase rate of the ratio $A_{Li}/A_{Ti}$ per cycle is less than 0.002, the over-insertion of Li into the inside of the negative electrode active material can be insufficiently inhibited during the overcharge. On the other hand, when the increase rate of the ratio $A_{Li}/A_{Ti}$ per cycle is more than 0.02, the negative electrode becomes excessively insulative during the overcharge. This may lead to a sudden drop of the potential of the negative electrode due to the over-voltage. When the potential of the negative electrode suddenly drops, a side reaction with the nonaqueous electrolyte may occur, and heat generation may be caused in the battery. That is, in the nonaqueous electrolyte battery according to the embodiment, the over-insertion of Li into the negative electrode active material particles can be prevented during the overcharge and, at the same time, the sudden drop of the negative electrode potential can be prevented during the overcharge, because the negative electrode has such a surface state that the ratio $A_{Li}/A_{Ti}$ is increased at a rate of 0.002 to 0.02 per cycle in the charge-and-discharge cycle test. As a result, the nonaqueous electrolyte battery according to the embodiment can exhibit improved safety.

It is preferable that, in the nonaqueous electrolyte battery according to the embodiment, the negative electrode has such a surface state that the ratio $A_{Li}/A_{Ti}$ is increased at a rate of 0.01 to 0.016 per cycle in the charge-and-discharge cycle test.

The increase of the ratio $A_{Li}/A_{Ti}$ on the negative electrode surface, for example, depends on the formation of a lithium-containing compound on the surface of the negative electrode active material particles. It is difficult to observe such a lithium-containing compound even if using a transmission electron microscope (TEM), and thus it is difficult to visually confirm the compound. According to the photoelectron spectroscopic measurement of the negative electrode in a nonaqueous electrolyte battery according to the embodiment, however, the increase of the Li atom abundance ratio, $A_{Li}$, with respect to the Ti atom abundance ratio, $A_{Ti}$, on the negative electrode surface can be found by repeating the charge-and-discharge cycles in the cycle conditions described above, in a nonaqueous electrolyte battery according to the embodiment. It can be judged that a compound containing at least Li is grown on the surface of the negative electrode active material, because the Li atom abundance ratio $A_{Li}$ on the negative electrode surface is increased.

Such a Li-containing compound as described above may include one or more compounds, depending on the composition of the material forming the negative electrode active material particle, the composition of the nonaqueous electrolyte, or the content of water contained in the nonaqueous electrolyte. It may include, for example, lithium fluoride (LiF), lithium oxide ($Li_2O$), lithium hydroxide (LiOH), lithium carbonate ($Li_2CO_3$), lithium hydrogen carbonate ($LiHCO_3$), and lithium alkyl carbonates (ROCOOLi wherein R is a hydrocarbon group).

The nonaqueous electrolyte battery including the negative electrode having such a surface state can be produced by comprehensively combining selection of materials, production conditions, and conditions for initial charge, aging and the like. For example, it is possible to produce a nonaqueous electrolyte battery according to the embodiment in the procedures described in each Example below.

In a nonaqueous electrolyte battery according to the embodiment, it is preferable, for example, that the negative electrode active material particles have a lithium titanate layer having a rock salt structure on a part of the surface thereof. FIG. 1 is a schematic cross-sectional view showing a negative electrode active material particle 10, which has a spinel-type lithium titanate particle 11, and a layer 12 of a rock salt-type lithium titanate, which covers the surface of the spinel-type lithium titanate particle 11, as one example. Should be noted that, although it is difficult to specify the lithium titanate having the rock salt structure by a compositional formula, due to the non-stoichiometry of lithium, for example, it can be represented by the general formula of $Li_{1-y}Ti_yO$ wherein y is within a range of 0.2 to 0.6. In the lithium titanate having the rock salt structure, there are crystallographically no sites into which Li can be excessively inserted. For that reason, the nonaqueous electrolyte batteries having the negative electrode active material particles having the layer of the lithium titanate having the rock salt structure on the surface thereof, among nonaqueous electrolyte batteries according to the embodiment, can further prevent the over-insertion of Li into the inside of the negative electrode active material in the over-charged state.

The layer of the lithium titanate having the rock salt structure has preferably a thickness of 5 nm to 50 nm. The layer of the lithium titanate layer having the rock salt structure and having the thickness as described above not only can prevent the over-insertion of Li but also does not hinder the Li conduction, whereby the non-uniformization of the Li concentration can be prevented. The sudden drop of the negative electrode potential can be accordingly prevented. The layer of the lithium titanate having the rock salt structure has more preferably a thickness of 5 nm to 30 nm.

A method for forming the layer of the rock salt-type lithium titanate on the surface of the negative electrode active material particles may include, for example, dry coating treatment methods such as a CVD method and a sputtering method; wet coating treatment methods such as a sol-gel method and non-electrolytic plating method; and mixing and pulverizing compounding treatment methods such as a ball mill method and a jet mill method.

A method for forming the layer of the rock salt-type lithium titanate according to the sol-gel method is briefly described as one example. First, a powder of spinel-type lithium titanate is provided. Separately, tetrabutoxy titanium ($Ti(C_4H_9O)_4$) and lithium acetate dihydrate ($CH_3COOLi.2H_2O$) are uniformly dissolved in ethanol in a composition ratio of Li:Ti of 2:1 to obtain an ethanol solution as a starting material. To the ethanol solution as the starting material, is added distilled water to prepare a mixed solution. Citric acid is added to the mixed solution, and the mixture is stirred until the mixture turns into a sol. To the obtained sol is introduced the powder of spinel-type lithium titanate, and the mixture is stirred. Next, the powder of spinel-type lithium titanate is taken out from the solution, which is dried. After that, the powder of spinel-type lithium titanate is calcinated at a temperature of 400° C. to 700° C. for several minutes to several hours. Thus, the layer of the lithium titanate having the rock salt structure can be obtained on the surface of the spinel-type lithium titanate powder. The thickness of the rock salt-type lithium titanate layer can be changed by controlling the weight amounts of the tetrabutoxytitanium and the lithium acetate dihydrate, and the weight amount of the spinel-type lithium titanate powder.

Hereinafter, the nonaqueous electrolyte battery according to the embodiment will be described in detail.

A nonaqueous electrolyte battery according to the embodiment includes a negative electrode, a positive electrode, and a nonaqueous electrolyte.

The negative electrode can include a negative electrode current collector and a negative electrode mixture layer supported on the negative electrode current collector. The negative electrode mixture layer may be supported one surface or both surfaces, that is, at least one main surface, of the negative electrode current collector. Therefore, the negative electrode mixture layer can be located at a surface of the negative electrode. The negative electrode current collector can include a portion a surface of which does not support the negative electrode mixture layer. The portion can function as a negative electrode tab. Alternatively, the negative electrode can also include a negative electrode tab which is a separate part from the negative electrode current collector.

The negative electrode active material particles as described above can be included in the negative electrode mixture layer. The negative electrode mixture layer can includes a negative electrode active material other than the negative electrode active material particles as described above. The negative electrode mixture layer can optionally include a negative electrode conductive agent and a negative electrode binder.

The positive electrode can include a positive electrode current collector and a positive electrode mixture layer supported on the positive electrode current collector. The positive electrode mixture layer may be supported on one surface or both surfaces, that is, at least one main surface, of the positive electrode current collector. The positive electrode current collector can include a portion a surface of which does not support the positive electrode mixture layer. The portion can function as a positive electrode tab. Alternatively, the positive electrode can also include a positive electrode tab which is a separate part from the positive electrode current collector.

The positive electrode mixture layer can include a positive electrode active material. The positive electrode mixture layer can optionally include a positive electrode conductive agent and a positive electrode binder.

The positive electrode and the negative electrode can constitute an electrode group. In the electrode group, the positive electrode mixture layer and the negative electrode mixture layer can be opposed to each other via, for example, a separator. The electrode group can have various structures. For example, the electrode group can have a stack type structure. The electrode group having the stack type structure can be obtained by stacking, for example, positive electrodes and negative electrodes with the separator sandwiched between the positive electrode mixture layer and the negative electrode mixture layer. Alternatively, the electrode group can have a wind-type structure. The wind-type electrode group can be obtained, for example, by stacking a separator, a positive electrode, another separator, and a negative electrode in this order to produce a stack, and wind the stack so that the negative electrode is positioned outside.

In the electrode group as described above, it is preferable that the thickness $t_A$ of the negative electrode mixture layer and the thickness $t_{AC}$ of the negative electrode current collector satisfy the following relationship of $2 \leq t_A/t_{AC} \leq 20$. Here, the thickness $t_A$ of the negative electrode mixture layer is the thickness of the layer when the negative electrode mixture layer is supported on one surface of the negative electrode current collector, and is the total thickness of the layers when the negative electrode mixture layer is supported on both surfaces of the negative electrode current collector. The nonaqueous electrolyte battery, which includes the electrode group including the negative electrode as described above, can promote the generation of the lithium-containing compound on the surface of the negative electrode active material particles and, at the same time, can sufficiently release heat through the current collector during the over-charge, whereby the increase of the thermal unstability of the lithium-containing compound can be suppressed. The ratio $t_A/t_{AC}$ is more preferably from 8 to 20.

In the electrode group as described above, it is preferable that the thickness $t_C$ of the positive electrode mixture layer and the thickness $t_{CC}$ of the positive electrode current collector satisfy the following relationship of $2 \leq t_C/t_{CC} \leq 20$. Here, the thickness $t_C$ of the positive electrode mixture layer is the thickness of the layer when the positive electrode mixture layer is supported on one surface of the positive electrode current collector, and is the total thickness of the layers when the positive electrode mixture layer is supported on both surfaces of the positive electrode current collector. The nonaqueous electrolyte battery, which includes the electrode group including the positive electrode as described above, can promote the generation of the lithium-containing compound on the surface of the negative electrode active material particle and, at the same time, can sufficiently release heat through the current collector during the over-charge, whereby the increase of the thermal unstability of the lithium-containing compound can be suppressed. The ratio $t_C/t_{CC}$ is more preferably from 8 to 20.

The nonaqueous electrolyte battery according to the embodiment can further include a positive electrode terminal and a negative electrode terminal. The positive electrode terminal can function as a conductor for electron transfer between the positive electrode and an external circuit when a part of the positive electrode terminal is electrically connected to a part of the positive electrode. The positive electrode terminal can be connected to, for example, the positive electrode current collector, particularly the positive electrode tab. Similarly, the negative electrode terminal can function as a conductor for electron transfer between the negative electrode and an external terminal when a part of the negative electrode terminal is electrically connected to a part of the negative electrode. The negative electrode terminal can be connected to, for example, the negative electrode current collector, particularly the negative electrode tab.

The nonaqueous electrolyte battery according to the embodiment can further include a case. The case can accommodate the electrode group and the nonaqueous electrolyte. The electrode group may be impregnated with the nonaqueous electrolyte in the case. A part of each of the positive electrode terminal and negative electrode terminal can be extended out from the case.

Hereinafter, the negative electrode, the positive electrode, the nonaqueous electrolyte, the separator, the positive electrode terminal, the negative electrode terminal, and the case will be described in more detail.

(1) Negative Electrode

The negative electrode current collector may be, for example, a sheet containing a material high in electrical conductivity. As the negative electrode current collector, for example, an aluminum foil or an aluminum alloy foil may be used. When the aluminum foil or the aluminum alloy foil is used, the thickness thereof is, for example, 20 μm or less, and preferably 15 μm or less. The aluminum alloy foil can contain magnesium, zinc, silicon or the like. The content of transition metals such as iron, copper, nickel, and chromium contained in the aluminum alloy foil is preferably 1% to or less.

A spinel-type lithium titanate, that is, a lithium titanate having a spinel structure can be represented by a chemical formula of $Li_{4+x}Ti_5O_{12}$. The subscript x has a value varying within a range of 0 to 3 depending on a state-of-charge.

The negative electrode active material particles including the spinel-type lithium titanate has an average primary particle size of 5 μm or less. When the average primary particle size is 5 μm or less, an effective area contributing to an electrode reaction can be sufficiently secured. Therefore, good discharge characteristics at a large current can be obtained.

The negative electrode active material particles including the spinel-type lithium titanate has a specific surface area of 1 to 10 $m^2/g$. When the specific surface area is 1 $m^2/g$ or more, an effective area contributing to an electrode reaction can be sufficient. Therefore, good discharge characteristics at a large current can be obtained. On the other hand, when the specific surface area is 10 $m^2/g$ or less, a reaction with a nonaqueous electrolyte can be suppressed. Therefore, lowering of a charge-and-discharge efficiency and gas generation during storage can be suppressed.

As the negative electrode active material other than the spinel-type lithium titanate, for example, a ramsdellite-type lithium titanate (that is, a lithium titanate having a ramsdellite-type structure) ($Li_{2+z}Ti_3O_7$ (z varies between 0 to 2 depending on charge-and-discharge states)) can be used.

The negative electrode conductive agent can be used, as necessary, to improve the current-collecting performance and suppress the contact resistance between the active material and the current collector. Examples of the negative electrode conductive agent include a carbon material. The carbon material preferably has high absorbability for an alkali metal, and high conductivity. Examples of the carbon material include acetylene black and carbon black.

The negative electrode binder can be used to bind the active material and the current collector. Examples of the negative electrode binder include polytetrafluoroethylene (PTFE), polyvinylidene fluoride (PVdF), fluorine-based rubber, styrene-butadiene rubber (SBR), polypropylene (PP), polyethylene (PE), and carboxymethyl cellulose (CMC).

The ratios of the negative electrode active material, negative electrode conductive agent, and negative electrode binder included in the negative electrode mixture layer are preferably 70 to 95% by weight, 0 to 25% by weight, and 2 to 10% by weight, respectively.

(2) Positive Electrode

As the positive electrode current collector, a sheet containing a material having high electric conductivity can be used. For example, aluminum foil or aluminum alloy foil can be used as the positive electrode current collector. When aluminum foil or aluminum alloy foil is used, the thickness thereof is, for example, 20 μm or less and preferably 15 μm or less. The aluminum alloy foil may contain magnesium, zinc, silicon or the like. In addition, the content of transition metal such as iron, copper, nickel, and chromium contained in the aluminum alloy foil is preferably 1% or less.

Examples of the positive electrode active material include a lithium-manganese composite oxide (e.g., $LiMn_2O_4$ or $LiMnO_2$), a lithium-nickel composite oxide (e.g., $LiNiO_2$), a lithium-cobalt composite oxide ($LiCoO_2$), a lithium-nickel-cobalt composite oxide (e.g., $LiNi_{1-x}Co_xO_2$, $0<x≤1$), a lithium-manganese-cobalt composite oxide (e.g., $LiMn_xCo_{1-x}O_2$, $0<x≤1$), a lithium-iron phosphate ($LiFePO_4$), and a lithium composite phosphate (e.g., $LiMn_xFe_{1-x}PO_4$, $0<x≤1$).

The positive electrode conductive agent can be used to improve current-collecting performance when necessary. Examples of the positive electrode conductive agent include acetylene black, carbon black, and graphite.

The positive electrode binder can be used to bind the positive electrode active material and the positive electrode current collector. Examples of the positive electrode binder include polytetrafluoroethylene (PTFE), polyvinylidene fluoride (PVdF), fluororubber, styrene-butadiene rubber (SBR), polypropylene (PP), polyethylene (PE), and carboxymethyl cellulose (CMC).

The ratios of the positive electrode active material, the positive electrode conductive agent, and the positive electrode binder included in the positive electrode mixture layer is preferably 80 to 95% by weight, 3 to 20% by weight, and 2 to 7% by weight respectively.

(3) Separator

The separator is made of an insulating material and can prevent electric contact between the positive electrode and the negative electrode. Preferably, the separator is made of a material through which the nonaqueous electrolyte can pass or has a shape through which the nonaqueous electrolyte can pass. Examples of the separator include nonwoven fabric made of synthetic resin, a polyethylene porous film, a polypropylene porous film, and a cellulose separator.

(4) Nonaqueous Electrolyte

The nonaqueous electrolyte can include, for example, a nonaqueous solvent, and an electrolyte dissolved in the nonaqueous solvent.

The nonaqueous solvent may be any known nonaqueous solvent used for nonaqueous electrolyte batteries. A first example of the nonaqueous solvent is cyclic carbonate such as ethylene carbonate (EC) and propylene carbonate (PC). A second example of the nonaqueous solvent is chain carbonate such as dimethyl carbonate, methylethyl carbonate, and diethyl carbonate; γ-butyrolactone; acetonitrile, methyl propionate, ethyl propionate; cyclic ether such as tetrahydrofuran and 2-methyl tetrahydrofuran; and chain ether such as dimethoxy ethane and diethoxy ethane. Compared with the solvent of the first example, the solvent of the second example has generally lower viscosity. In addition, the nonaqueous solvent may be a solvent obtained by mixing the solvent of the first example with the solvent of the second example.

The electrolyte is, for example, alkali salt, and preferably lithium salt. The electrolyte preferably includes at least one lithium salt an anion of which has the van der Waals ionic radius of 0.25 nm or more and 0.4 nm or less. Examples of such a lithium salt include lithium hexafluorophosphate ($LiPF_6$), lithium hexafluoroarsenate ($LiAsF_6$), and lithium trifluoromethanesulfonate ($LiCF_3SO_3$). The electrolyte is preferably lithium hexafluorophosphate ($LiPF_6$).

The concentration of electrolyte in the nonaqueous electrolyte is preferably 0.5 to 2 mol/L.

(5) Positive Electrode Terminal and Negative Electrode Terminal

The positive electrode terminal and the negative electrode terminal are preferably formed from a material having a high electric conductivity. When each of them is connected to a current collector, the terminals are preferably formed from the same materials as in the current collectors, in order to decrease the contact resistance.

(6) Case

As the case, a case formed of a laminate film having a thickness of 0.5 mm or less or a metal case having a film-thickness of 1 mm or less can be used.

The laminate film more preferably has a thickness of 0.2 mm or less.

The laminate film used is a multilayer film including resin layers and a metal layer sandwiched between the resin layers. The metal layer is preferably an aluminum foil or an aluminum alloy foil for reducing the weight. The resin layer may be, for example, a polymeric material such as polypropylene (PP), polyethylene (PE), nylon, or polyethylene terephthalate (PET). The laminate film may be heat-sealed to be formed into the shape of a case.

The metal case has a film-thickness of, more preferably 0.5 mm or less, and still more preferably 0.2 mm or less.

The metal case is made of aluminum or an aluminum alloy and the like. As the aluminum alloy, an alloy containing an element such as magnesium, zinc, or silicon is preferable. If a transition metal such as iron, copper, nickel, or chromium is contained in the alloy, the content thereof is preferably set to 1% by weight or less. Thus, long-term reliability in a high-temperature environment and a heat-releasing property can be dramatically improved.

Examples of the shape of the case include a flat type (thin type), rectangular type, cylindrical type, coin type, and button type. The case can take various sizes depending on the application. For example, when the nonaqueous electrolyte battery according to the embodiment is used for the application of a portable electric device, the case can take a small size according to the size of the electric device where the battery is to be installed. Alternatively, when the battery is one installed in a two- or four-wheeled vehicle, the case may be a case for a large-size battery.

Next, a specific example of the nonaqueous electrolyte battery according to the embodiment will be described with reference to the drawings.

FIG. 2 is a partially cutaway perspective view showing a nonaqueous electrolyte battery, which is one example according to the embodiment. FIG. 3 is an enlarged cross-sectional view showing the part A of the nonaqueous electrolyte battery in FIG. 2.

A nonaqueous electrolyte battery 100 shown in FIGS. 2 and 3 includes a flat-type electrode group 1.

The flat-type electrode group 1 includes a negative electrode 2, a positive electrode 3, and a separator 4.

The negative electrode 2 includes a negative electrode current collector 21 and a negative electrode mixture layer 22 supported on the negative electrode current collector 21, as shown in FIG. 3. The positive electrode 3 includes a positive electrode current collector 31 and a positive electrode mixture layer 32 supported on the positive electrode current collector 31, as shown in FIG. 3.

In the electrode group 1, as shown in FIG. 3, the negative electrode 2 and the positive electrode 3 are laminated in a state where the separator 4 is sandwiched between the negative electrode mixture layer 22 and the positive electrode mixture layer 32. Such an electrode group 1 can be obtained according to the following procedure. First, a plate-like negative electrode 2 and a plate-like positive electrode 3 are stacked with a separator 4 sandwiched therebetween. Next, another separator 4 is provided on a positive electrode mixture layer 32 which is not opposed to the negative electrode 2, to produce a stack. The stack is wound with the negative electrode 2 located outside. Then, a core is extracted, and the stack is then pressed to form the stack into a flat shape. Thus, the electrode group 1 shown in FIGS. 2 and 3 can be obtained.

A belt-like negative electrode terminal 5 is electrically connected to the negative electrode 2. A belt-like positive electrode terminal 6 is electrically connected to the positive electrode 3.

The nonaqueous electrolyte battery 100 shown in FIGS. 2 and 3 further includes a casing bag 7 of laminate film as the case.

The electrode group 1 is accommodated in the laminate film casing bag 7 in a state that an end of the negative electrode terminal 5 and an end of the positive electrode terminal 6 are extended out from the casing bag 7. The laminate-film casing bag 7 accommodates a liquid nonaqueous electrolyte (not shown). The electrode group 1 is impregnated with the nonaqueous electrolyte. The peripheral of the casing bag 7 is heat-sealed. Thus, the electrode group 2 and the nonaqueous electrolyte are enclosed in the casing bag 7.

Next, the method for observing the surface state of the negative electrode included in the nonaqueous electrolyte battery, according to a photoelectron spectroscopy is described.

1. Sampling

First, a nonaqueous electrolyte battery, which is a subject to be measured, is provided. The provided nonaqueous electrolyte battery is discharged until the potential of the negative electrode reaches 1.6 V (vs. Li/Li$^+$) or more. Next, the discharged nonaqueous electrolyte battery is disassembled in an inert atmosphere such as argon. The electrode group is taken out from the disassembled nonaqueous electrolyte battery. At that time, take care so that the positive electrode is not brought into electric contact with the negative electrode. The electrode group is taken out in a state in which a repeating structure of—the positive electrode—the separator-negative electrode—the separator—the positive electrode-, as shown in FIG. 3, is maintained. The taken out electrode group is divided into the separator, the positive electrode, and the negative electrode by using, for example, a pair of tweezers. The thus obtained negative electrode is immersed in an organic solvent such as ethylmethyl carbonate to wash it. After the washing, the negative electrode is dried.

Next, the dried negative electrode is cut by using a cutter into an electrode piece having a size of approximately 5 mm square, which is used as a sample.

2. Measurement

The electrode piece, which has been previously provided as the sample, is put on a measurement stage. Next, the measurement stage, on which the electrode piece is put, is introduced into a photoelectron spectroscopic measurement apparatus (for example, VG Theta Probe manufactured by Thermo Fisher Scientific Inc.), and the inside of the apparatus is made a vacuum. In the apparatus, the measurement is performed using Alkα rays as an excited X-ray, an X-ray spot diameter being adjusted to 800×400 µm. Thus, a photoelectron spectrum of the sample can be obtained.

3. Analysis

From the obtained photoelectron spectrum, the ratio $A_{Li}/A_{Ti}$ is calculated. Here, the Li atom abundance ratio $A_{Li}$ is calculated from an area of a peak that belongs to the Li 1s-orbital and appears in a binding energy region of 52 eV to 58 eV. The atom abundance ratio $A_{Ti}$ is calculated from an area of a peak that belongs to the Ti 2p-orbital and appears in a binding energy region of 455 eV to 462 eV. Each atom abundance ratio is calculated as follows: First, constituent elements, which are population parameters, are carbon (C), oxygen (O), lithium (Li), nitrogen (N), fluorine (F), phosphorus (P), sulfur (S), titanium (Ti), manganese (Mn), cobalt (Co), and nickel (Ni). Then, an atom abundance ratio of each element is calculated according to the method using an average matrix relative sensitivity factors, described in ISO18118. A peak of an inner core spectrum of each element, used in the calculation, is decided as follows: A peak of C is to be a C is peak appearing in a binding energy region of 280 eV to 295 eV. A peak of O is to be an O 1s peak appearing in a binding energy region of 520 eV to 545 eV. A peak of Li is to be an Li 1s peak appearing in a binding energy region of 50 eV to 60 eV. A peak of N is to be an N is peak appearing in a binding energy region of 390 eV to 410 eV. A peak of F is to be an F 1s peak appearing in a binding energy region of 675 eV to 695 eV. A peak of P is to be a P 2p peak appearing in a binding energy region of 125 eV to 145 eV. A peak of S is to be an S 2p peak appearing in a binding energy region of 160 eV to 180 eV. A peak of Ti is to be a Ti 2p peak appearing in a binding energy region of 452 eV to 462 eV. A peak of Mn is to be an Mn 2p peak appearing in a binding energy region of 630 eV to 660 eV. A peak of Co is to be a Co 2p peak appearing in a binding energy region of 780 eV to 810 eV. A peak of Ni is to be an Ni 3p peak appearing in a binding energy region of 64 eV to 72 eV.

Figure 4:
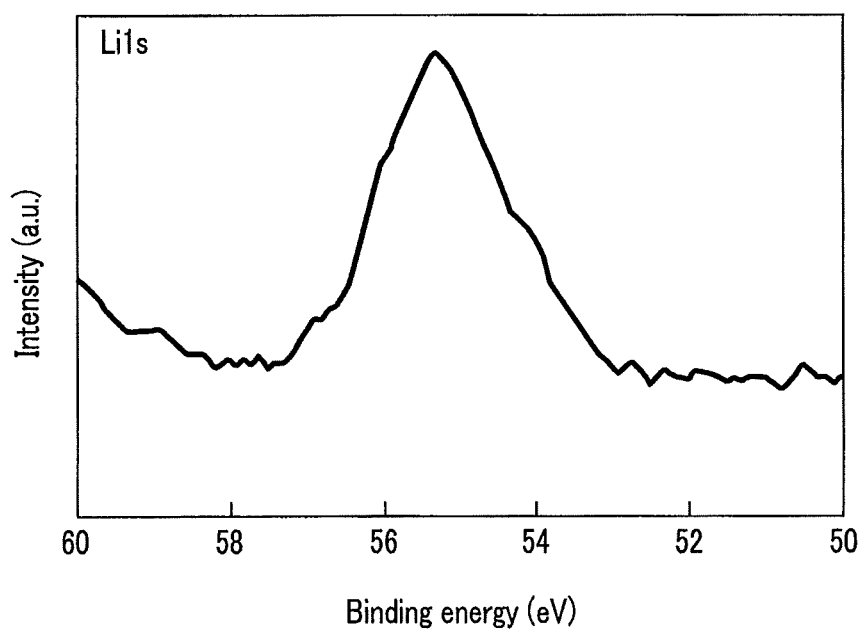
FIG. 4 shows a photoelectron spectrum for a surface of a negative electrode included in a nonaqueous electrolyte battery of Example 1.
Figure 5:
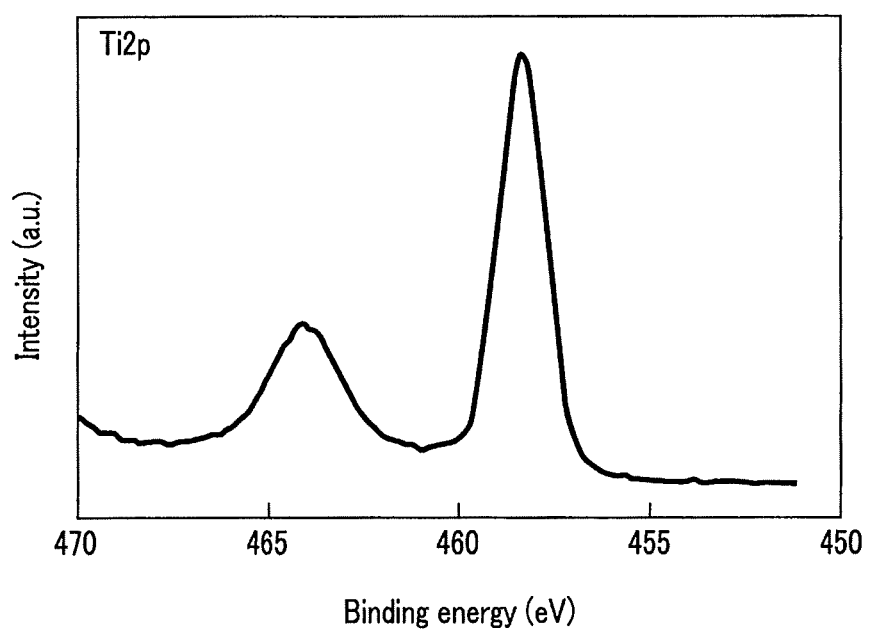
FIG. 5 shows another photoelectron spectrum for the surface of the negative electrode included in the nonaqueous electrolyte battery of Example 1.

As an example, photoelectron spectra of the surface of the negative electrode included in an example of the nonaqueous electrolyte battery according to the embodiment are shown in FIG. 4 and FIG. 5. In the photoelectron spectrum shown in FIG. 4, the peak appearing in the binding energy region of 52 eV to 58 eV is a peak belonging to the Li 1s. In the photoemission spectrum shown in FIG. 5, the peak appearing in the binding energy region of 455 eV to 462 eV is a peak belonging to the Ti 2p.

From the Li atom abundance ratio $A_{Li}$ and the atom abundance ratio $A_{Ti}$ as obtained above, the ratio $A_{Li}/A_{Ti}$ of each sample is calculated.

Next, a method for deciding the amount of increase of the ratio $A_{Li}/A_{Ti}$ in the nonaqueous electrolyte battery, which is a unit battery, included in the battery pack is described.

First, a nonaqueous electrolyte battery, which is a subject to be measured, is provided. Specifically, one battery pack is disassembled and unit batteries are taken out therefrom. The taken out unit batteries are used as the nonaqueous electrolyte battery, which is a subject to be measured. Here, the battery pack, which is to be disassembled, has a battery capacity before a cycle test of 95 or more based on a nominal rating capacity as 100. The battery capacity before a cycle test is calculated from a discharge capacity obtained when the battery, which had been charged at 1 C up to 2.7 V under the temperature environment of 25° C., is discharged at 1 C rate up to 1.5 V. That is, batteries included in a battery pack, which have been extremely deteriorated, are excluded from the subjects to be measured.

One of the provided nonaqueous electrolyte batteries is discharged until the negative electrode potential reaches 1.6 V (vs. Li/Li$^+$) or more. Next, from the discharge nonaqueous electrolyte battery, an electrode piece having a size of approximately 5 mm square is taken out in the same procedures as described above, and the piece is used as a reference sample.

On the other hand, each of the remaining nonaqueous electrolyte battery provided is subjected to a charge-and-discharge cycle test. The charge-and-discharge cycle test is performed in a 45° C. environment at 2 C rate within a voltage range from the lower limit battery voltage of 1.5±0.1 V to the upper limit battery voltage of 2.7±0.1 V, as described above. The number of cycles in the charge-and-discharge cycle test is set to be from 1000 to 5000.

Subsequently, the nonaqueous electrolyte battery is discharged until the negative electrode potential reaches 1.6 V (vs. Li/Li+) or more. Next, from the discharged nonaqueous electrolyte battery, an electrode piece having a size of approximately 5 mm square is taken out in the same procedures as described above, and the piece is used as a measurement sample.

Next, the measurement samples and the reference sample are subjected to the photoelectron spectroscopic measurement described above, the results are analyzed, and the ratios $A_{Li}/A_{Ti}$ of the measurement samples and the reference sample are calculated.

Next, the ratio $A_{Li}/A_{Ti}$ of the reference sample is subtracted from the ratio $A_{Li}/A_{Ti}$ of each measurement sample, and the amount of increase $\Delta A_{Li}/A_{Ti}$ is calculated for the ratio $A_{Li}/A_{Ti}$ of each measurement sample. Next, the amount of increase $\Delta A_{Li}/A_{Ti}$ of each measurement sample is divided by the total number of the charge-and-discharge cycles, whereby the amount of increase in the ratio $A_{Li}/A_{Ti}$ per cycle, $\Delta_{cycle}A_{Li}/A_{Ti}$, can be calculated. When measurement samples are produced, the amount of increase in the ratio $A_{Li}/A_{Ti}$ per cycle, $\Delta_{cycle}A_{Li}/A_{Ti}$, is calculated from $\Delta A_{Li}/A_{Ti}$, which is calculated by subtracting the ratio $A_{Li}/A_{Ti}$ of the reference sample from an average value of the ratios $A_{Li}/A_{Ti}$ of the measurement samples.

Next, a method for measuring the thickness of a layer of the rock salt-type lithium titanate, which can be formed on a part of the surface of the negative electrode active material particles, is described.

The thickness of the layer of the rock salt-type lithium titanate, which can be formed on a part of the surface of the negative electrode active material particles, can be measured using a transmission electron microscope (Transmission Electron Microscopy: TEM). Specific procedures thereof are described below.

1. Sampling

A gap in the electrode mixture layer of the negative electrode, which is taken out from the nonaqueous electrolyte battery in the same procedures as described above, is embedded with a resin. Next, a surface protective film such as tungsten or platinum is formed on the negative electrode surface. A thin piece sample being in about 10 μm square and having a thickness of 0.05 μm to 0.2 μm is obtained from the surface of the negative electrode covered with the protective film, according to a Focused Ion Beam (FIB) method using gallium ion. In the sampling, an accelerating voltage of the gallium ion is set to be 10 to 40 kV.

2. Measurement

From the samples as obtained above, active material particles, which are directed in an appropriate observation direction to a transmitted electron beam, are selected, and a high resolution TEM observation is performed at 300000 magnification or more. In this measurement, the electron beam is entered from a direction of crystal axis [110] in a cubic rock-salt structure, the rock salt-type lithium titanate layer, covering the particle surface, is observed, and a boundary between the rock salt-type lithium titanate layer and the spinel-type lithium titanate particles is discriminated.

The rock salt-type lithium titanate layer and the spinel-type lithium titanate particle can be discriminated as follows:

First, Fast Fourier Transformation (FFT) is performed at an arbitrary position around the active material particle surface in the obtained TEM image within a range of a square having one side of 3 nm to 5 nm, whereby an FFT pattern is obtained The spinel-type lithium titanate has a lattice constant of 8.35 to 8.43, and a crystal structure belonging to a space group Fd-3m (No. 227). In the FFT pattern of the spinel-type lithium titanate obtained in the procedures described above, accordingly, diffraction spots belonging to crystal plane indices of 1-11, 1-1-1, −111 and −11-1 are obtained as characteristic diffraction spots at a position of 0.205, which is the shortest from the center point, to 0.207 (1/nm). These diffraction spots are referred to as "diffraction spots {111}_sp" altogether.

On the other hand, the rock salt-type lithium titanate has a lattice constant of 4.17 to 4.22, and a crystal structure belonging to a space group Fm-3m (No. 225). In the FFT pattern of the rock salt-type lithium titanate obtained in the procedures described above, accordingly, diffraction spots belonging to crystal plane indices of 1-11, 1-1-1, −111 and −11-1 are obtained as characteristic diffraction spots at a position of 0.411, which is the shortest from the center point, to 0.415 (1/nm). These diffraction spots are referred to as "diffraction spots {111}-rs" altogether.

As described above, the diffraction spots {111}_sp and the diffraction spots {111}_rs appear at a different position from each other in the FFT pattern; in other words, the diffraction spots {111}_sp, observed in the spinel-type lithium titanate is not observed in the lithium titanate having the rock salt structure. The boundary between the spinel-type lithium titanate particle and the rock salt-type lithium titanate layer, accordingly, can be discriminated.

A distance from the thus defined boundary between the spinel-type lithium titanate particle and the rock salt-type lithium titanate layer to the surface of the rock salt-type lithium titanate layer is measured 10 times at arbitrary different points in a normal direction of the rock salt-type lithium titanate layer. An average value of the lengths as measured above is defined as the thickness of the rock salt-type lithium titanate layer. In addition, the longest length value in the 10 measurements is defined as tmax and the shortest length is defined as tmin.

In a nonaqueous electrolyte battery according to the embodiment, the negative electrode includes the negative electrode active material particles including the spinel-type lithium titanate, and the negative electrode has such a surface state that a ratio $A_{Li}/A_{Ti}$ obtained by the photoelectron spectroscopic measurement for a surface is increased at a rate of 0.002 to 0.02 per cycle in a charge-and-discharge cycle test under the predetermined condition. Due to this, the nonaqueous electrolyte battery according to the embodiment can prevent Li from being inserted into the negative electrode active material particles even if the battery is in an overcharged state. As a result, the nonaqueous electrolyte battery according to the embodiment can exhibit improved safety.

EXAMPLES

Hereinafter, the present invention will be described with some examples. However, the present invention is not limited to the following Examples, without departing from the spirit of the present invention.

Example 1

In Example 1, a nonaqueous electrolyte battery of Example 1 was produced in the following procedures.

<Production of Positive Electrode>

91% by weight of a lithium-nickel-cobalt oxide ($LiNi_{0.8}Co_{0.2}O_2$) powder as a positive electrode active material, 2.5% by weight of acetylene black, 3% by weight of graphite, and 3.5% by weight of polyvinylidene fluoride (PVdF) were added to N-methylpyrrolidone, and the mixture was mixed to produce a slurry. The slurry was coated on both surfaces of a current collector formed of an aluminum foil having a thickness of 15 μm, which was dried and pressed to prepare a positive electrode having a positive electrode layer with a density of 3.0 g/cm$^3$. A ratio $t_C/t_{CC}$ in the thickness of the positive electrode mixture layer to the positive electrode current collector was set to be 5.5.

<Production of Negative Electrode>

As a negative electrode active material, a spinel-type lithium titanate ($Li_4Ti_5O_{12}$) powder having a layer of a rock salt-type lithium titanate on a part of the surface thereof was provided. The spinel-type lithium titanate was synthesized in the following method. First, 53 g of tetrabutoxytitanium ($Ti(C_4H_9O)_4$) and 32 g of lithium acetate dihydrate ($CH_3COOLi \cdot H_2O$) were uniformly dissolved in 400 ml of a mixed solution of ethanol and distilled water. After that, citric acid was added to the resulting solution, and the mixture was stirred until the mixture turned into a sol. Subsequently, 100 g of spinel-type lithium titanate powder was introduced into the obtained sol, and the mixture was stirred, which was dried at 100° C. Subsequently, the dried powder was baked at a temperature of 500° C. for 12 hours. Thus, the spinel-type lithium titanate powder having the layer of the rock salt-type lithium titanate on a part of the surface thereof was obtained.

Next, the spinel-type lithium titanate powder, graphite, acetylene black, and PVdF were added to NMP, and the mixture was mixed to produce a slurry. At that time, a blending ratio of the spinel-type lithium titanate powder:the graphite:the acetylene black:PVdF was set to 85% by weight:5% by weight:3% by weight:7% by weight.

Subsequently, the slurry was coated on both surfaces of a current collector formed of an aluminum foil having a thickness of 11 μm, which was dried and pressed. Thus, a negative electrode having a negative electrode mixture layer with a density of 2.0 g/cm$^3$ was produced. A ratio $t_A/t_{AC}$ in the thickness of the negative electrode mixture layer to the negative electrode current collector was set to 7.0.

Subsequently, a mixed gas of carbon dioxide gas and nitrogen gas having a carbon dioxide concentration of about 5% was sprayed to the negative electrode surface in an environment having a dew-point of −15° C. so that the carbon dioxide was adsorbed on the surface. In this way, the generation of the Li-containing compound layer, such as $Li_2CO_3$ or $LiHCO_3$, on the surface can be promoted.

<Production of Electrode Group>

The positive electrode produced as above, a separator formed of a polyethylene porous film having a thickness of 20 μm, the negative electrode produced as above, and the separator were stacked in this order, and then the resulting stack was spirally wound so that the negative electrode is located as the outermost layer to produce an electrode group. The obtained electrode group was heat-pressed at 90° C., whereby a flat electrode group having a width of 58 mm, a height of 95 mm and a thickness of 3.0 mm.

The obtained electrode group was accommodated in a casing bag of a laminate film. The laminate film has a thickness of 0.1 mm and is formed of an aluminum foil having a thickness of 40 μm and polypropylene layers formed on both surfaces of the aluminum foil. And then, a periphery part of the casing bag was heat-sealed with a part thereof left non-sealed as an opening. After that, the resulting product was vacuum-dried at 80° C. for 24 hours.

<Preparation of Nonaqueous Electrolytic Solution>

Ethylene carbonate (EC) and methylethyl carbonate (MEC) were mixed in a volume ratio of 1:2 to prepare a mixed solvent. In the mixed solvent was dissolved lithium hexafluorophosphate ($LiPF_6$) in a concentration of 1.0 mol/L to prepare a liquid nonaqueous electrolyte.

<Production of Battery>

The liquid nonaqueous electrolyte was poured through the opening into the casing bag in which the electrode group was previously accommodated. Then, the opening was heat-sealed to seal the casing bag, whereby a nonaqueous electrolyte battery having the same structure as that shown in FIG. 2 and FIG. 3 was produced. Two nonaqueous electrolyte batteries were also produced in the same production conditions as above.

<Conditioning to Initial State>

Next, the nonaqueous electrolyte batteries were charged at 2.8 V at 0.2 C rate in a 25° C. environment. After that, the nonaqueous electrolyte batteries were stored at an environment temperature of 60° C. for 24 hours. Then the nonaqueous electrolyte batteries were discharged at an environment temperature of 25° C. at 0.2 C rate until the voltage reached 1.5 V, and then were charged up to a state-of-charge of 50%. This state was defined as an initial state.

<Charge-and-Discharge Cycle Test>

One of the two nonaqueous electrolyte batteries was subjected to a charge-and-discharge cycle test in a 45° C. environment at 2 C rate within a voltage range of the lower limit battery voltage of 1.5 V to the upper limit of 2.7 V. In the charge-and-discharge cycle test, the charge-and-discharge cycle was repeated 5000 times.

<Measurement of Atom Abundance Ratios of Li and Ti ($A_{Li}/A_{Ti}$) on Negative Electrode Surface>

The surface states of the negative electrodes, in the one nonaqueous electrolyte battery in the initial state and the nonaqueous electrolyte battery that had been subjected to 5000 times of the charge-and-discharge cycles, were observed according to the photoelectron spectroscopy in the procedures as described above.

Each of FIG. 4 and FIG. 5 shows a part of the photoelectron spectrum obtained in the negative electrode surface in the nonaqueous electrolyte battery in the initial state. The peak appearing in the binding energy region of 52 eV to 58 eV, shown in FIG. 4, is a peak derived from Li 1s-orbital. On the other hand, the peak appearing in the binding energy region of 455 eV to 462 eV, shown in FIG. 5, is a peak derived from Ti 2p-orbital.

From the results obtained by the photoelectron spectroscopy, the amount of increase, $\Delta_{cycle}A_{Li}/A_{Ti}$, in the ratio $A_{Li}/A_{Ti}$ per cycle was calculated in the procedures described above. In Example 1, $\Delta_{cycle}A_{Li}/A_{Ti}$ was 0.01.

From the results described above, it was found that the layer of the lithium-containing compound was formed on the surface of the negative electrode active material particles included in the negative electrode.

<Confirmation of Thickness of Rock Salt-Type Lithium Titanate Layer>

Figure 6:
FIG. 6 shows a cross-sectional TEM image of a part of the negative electrode included in the nonaqueous electrolyte battery of Example 1.

The surface of the negative electrode in one nonaqueous electrolyte battery produced in Example 1 was observed using TEM in the procedures as described above. FIG. 6 shows a cross-sectional TEM image of a part of the negative electrode included in the nonaqueous electrolyte battery of Example 1. In FIG. 6, a thickness shown by each of white arrows is a thickness of the rock salt-type lithium titanate layer. Should be noted that, in the photoelectron spectroscopic measurement described above, it was found that the layer of the lithium-containing compound was formed on the surface of the negative electrode active material particles included in the negative electrode, but, in the TEM image shown in FIG. 6, such a layer of a lithium-containing compound layer cannot be visually confirmed. This is because the gap in the electrode mixture layer of the negative electrode is embedded with a resin upon the production of the sample for TEM observation, and thus the presence of the lithium-containing compound layer cannot be visually confirmed in the TEM image.

As a result of the observation, it was found that the rock salt-type lithium titanate layer existing on the negative electrode surface had a thickness of 10 nm.

Comparative Example 1

In Comparative Example 1, two nonaqueous electrolyte batteries of Comparative Example 1 were produced in the same manner as in Example 1, except that a spinel-type lithium titanate powder having no layer of rock salt-type lithium titanate on its surface was used as the negative electrode active material, and the nonaqueous electrolyte was prepared by dissolving lithium tetrafluoroborate ($LiBF_4$), as the lithium salt in the nonaqueous electrolyte, in a concentration of 1.0 mol/L.

The nonaqueous electrolyte battery of Comparative Example 1 was also subjected to the charge-and-discharge cycle test, the measurement of the atom abundance ratios of Li and Ti ($A_{Li}/A_{Ti}$) on the negative electrode surface, and the confirmation of the thickness of the oxide layer, in the same manner as in Example 1. The results are shown in Table 1 below.

<Over-Charge Test>

The one nonaqueous electrolyte battery of Example 1 and the one nonaqueous electrolyte battery of Comparative Example 1 were charged at 1 C rate in a 25° C. environment up to a state-of-charge of 100%, and then subjected to an over-discharge test in which each of the battery was charged at 1 C rate. When SOC where the sudden heat generation occurred in Comparative Example 1 is defined as a standard (=1), SOC where the sudden heat generation occurred in Example 1 was 1.1.

Example 2

In Example 2, a nonaqueous electrolyte battery of Example 2 was produced in the same manner as in Example 1, except that lithium bis(trifluoromethanesulfonyl)imide (LiTFSI) was dissolved in a mixed solvent in which ethylene carbonate (EC) and methylethyl carbonate (MEC) were mixed in a volume ratio of 1:2 in a concentration of 1.0 mol/L to produce a liquid nonaqueous electrolyte.

Examples 3 to 5

In each of Examples 3 to 5, a nonaqueous electrolyte battery of each Example 3 to 5 was produced in the same manner as in Example 1, except that the ratio $t_C/t_{CC}$ between the thickness of the positive electrode mixture layer and the thickness of the positive electrode current collector, and the ratio $t_A/t_{AC}$ between the thickness of the negative electrode mixture layer and the thickness of the negative electrode current collector were changed into a range of 2 to 20 as shown in Table 1 below.

Example 6

In Example 6, a nonaqueous electrolyte battery of Example 6 was produced in the same manner as in Example 1, except that a spinel-type lithium titanate powder having no layer of rock salt-type lithium titanate on its surface was used as the negative electrode active material.

Examples 7 and 8

In Examples 7 and 8, a nonaqueous electrolyte battery of each Example 7 and 8 was produced in the same manner as in Example 1, except that the spinel-type lithium titanate powder having a layer of the rock salt-type lithium titanate on a part of the surface thereof was synthesized in a different method.

In Example 7, a spinel-type lithium titanate powder having the layer of the rock salt-type lithium titanate on a part of the surface thereof was synthesized in the same manner as in Example 1, except that 27 g of tetrabutoxytitanium ($Ti(C_4H_9O)_4$) and 16 g of lithium acetate dihydrate ($CH_3COOLi \cdot H_2O$) were uniformly dissolved in 310 ml of a mixed solution of ethanol and distilled water.

In Example 8, a spinel-type lithium titanate powder having the layer of the rock salt-type lithium titanate on a part of the surface thereof was synthesized in the same manner as in Example 1, except that 266 g of tetrabutoxytitanium ($Ti(C_4H_9O)_4$) and 159 g of lithium acetate dihydrate ($CH_3COOLi.H_2O$) were uniformly dissolved in 1150 ml of a mixed solution of ethanol and distilled water.

Comparative Example 2

In Comparative Example 2, a nonaqueous electrolyte battery of Comparative Example 2 was produced in the same manner as in Example 1, except that a spinel-type lithium titanate powder having no layer of rock salt-type lithium titanate on its surface was used, the ratio $t_C/t_{CC}$ between the thickness of the positive electrode mixture layer and the thickness of the positive electrode current collector was set to 24, and the ratio $t_A/t_{AC}$ between the thickness of the negative electrode mixture layer and the thickness of the negative electrode current collector was set to 27.

Comparative Example 3

In Comparative Example 3, a nonaqueous electrolyte battery of Comparative Example 3 was produced in the same manner as in Example 1, except that the spinel-type lithium titanate powder having a layer of the rock salt-type lithium titanate on a part of the surface thereof was synthesized in a different method.

In Comparative Example 3, the spinel-type lithium titanate powder having the layer of the rock salt-type lithium titanate on a part of the surface thereof was synthesized in the same manner as in Example 1, except that 532 g of tetrabutoxytitanium ($Ti(C_4H_9O)_4$) and 319 g of lithium acetate dihydrate ($CH_3COOLi.H_2O$) were uniformly dissolved in 2100 ml of a mixed solution of ethanol and distilled water.

The nonaqueous electrolyte batteries from Examples 2 to 8 and Comparative Examples 2 to 3 were subjected to the charge-and-discharge cycle test, the measurement of the atom abundance ratios of Li and Ti ($A_{Li}/A_{Ti}$) on the negative electrode surface, the confirmation of the thickness of the rock salt-type lithium titanate layer, and the over-charge test in the same manner as in Example 1. The results are shown in Table 1 below.

From the results in Table 1, it is found that in each of the nonaqueous electrolyte batteries of Examples 1 to 8, having a $\Delta_{cycle}A_{Li}/A_{Ti}$ of 0.002 to 0.02, SOC, leading to the sudden heat generation, is higher than that of the nonaqueous electrolyte battery of Comparative Example 1. From the results, it is found that the nonaqueous electrolyte batteries of Examples 1 to 8 can prevent the over-insertion of Li into the negative electrode active material particles during the over-charge and, at the same time, can prevent the sudden drop of the negative electrode potential during the over-charge.

On the other hand, in the nonaqueous electrolyte battery of Comparative Example 1, SOC, leading to the sudden heat generation, was lower than that of each of the nonaqueous electrolyte batteries of Examples 1 to 8. It can be considered that this was caused because, in nonaqueous electrolyte battery of Comparative Example 1, $\Delta_{cycle}A_{Li}/A_{Ti}$ was low, i.e., 0.0001, and thus the over-insertion of Li into the negative electrode active material particles could not be prevented during the over-charge.

In each of Comparative Examples 2 and 3, SOC, leading to the sudden heat generation, was lower than that in Comparative Example 1. It can be considered that it was caused because, in each of the nonaqueous electrolyte batteries of Comparative Examples 2 and 3, $\Delta_{cycle}A_{Li}/A_{Ti}$ was more than 0.02, and thus the negative electrode became excessively insulative during the over-charge, whereby the negative electrode potential suddenly dropped due to the over-voltage.

From the results in Table 1, accordingly, it is found that the nonaqueous electrolyte batteries of Examples 1 to 8 can further suppress the heat generation during the over-charge, compared to the nonaqueous electrolyte batteries of Comparative Examples 1 to 3, and thus they can exhibit the stability which is more improved than that of the nonaqueous electrolyte batteries of Comparative Examples 1 to 3.

In the over-charge tests in Examples described above, when the temperature elevation, measured with a K-type thermocouple attached to each nonaqueous electrolyte battery, reached a range of 5° C. to 60° C. per unit time of 10 seconds, it was judged that the sudden heat generation occurred in the nonaqueous electrolyte battery. The thermocouple was attached to a place around the part A shown in Table 2, i.e., a central vicinity of the casing bag.

TABLE 1

| | Generation Rate of Li-containing Compound Layer $\Delta_{cycle}A_{Li}/A_{Ti}$ | Layer of Rock Salt-type Lithium Titanate Thickness (nm) | Ratio in Thickness between Positive Electrode Mixture Layer and Current Collector $t_C/t_{CC}$ | Ratio in Tickness between Negative Electrode Mixture Layer and Current Collector $t_A/t_{AC}$ | SOC leading to Sudden Heat Generation SOC (Ratio to SOC in Comparative Example 1) |
|---|---|---|---|---|---|
| Example 1 | 0.010 | 10 | 5.5 | 7.0 | 1.10 |
| Example 2 | 0.007 | 10 | 5.5 | 7.0 | 1.08 |
| Example 3 | 0.002 | 10 | 2.0 | 2.0 | 1.10 |
| Example 4 | 0.015 | 10 | 13 | 15 | 1.30 |
| Example 5 | 0.020 | 10 | 20 | 20 | 1.05 |
| Example 6 | 0.003 | — | 5.5 | 7.0 | 1.05 |
| Example 7 | 0.005 | 5 | 5.5 | 7.0 | 1.10 |
| Example 8 | 0.015 | 50 | 5.5 | 7.0 | 1.30 |
| Comparative Example 1 | 0.0001 | — | 5.5 | 7.0 | 1.00 |
| Comparative Example 2 | 0.039 | — | 24 | 27 | 0.90 |
| Comparative Example 3 | 0.030 | 100 | 5.5 | 7.0 | 0.88 |

In a nonaqueous electrolyte battery according to at least one embodiment and Example described above, the negative electrode includes the negative electrode active material particles including the spinel-type lithium titanate, and the negative electrode has such a surface state that a ratio $A_{Li}/A_{Ti}$ obtained by the photoelectron spectroscopic measurement for a surface is increased at a rate of 0.002 to 0.02 per cycle in a charge-and-discharge cycle test under the predetermined condition. Due to this, the nonaqueous electrolyte battery according to the embodiment can prevent Li from being inserted into the negative electrode active material particles even if the battery is in an overcharged state. As a result, the nonaqueous electrolyte battery can exhibit improved safety.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A negative electrode comprising negative electrode active material particles comprising a spinel-type lithium titanate, the negative electrode having such a surface state that a ratio $A_{Li}/A_{Ti}$ of an Li atom abundance ratio $A_{Li}$ to a Ti atom abundance ratio $A_{Ti}$, obtained according to a photoelectron spectroscopic measurement for a surface, is increased at a rate of 0.002 to 0.02 per cycle in a charge-and-discharge cycle test, wherein the test is performed in a 45° C. environment at 2 C rate within a voltage range from a lower limit battery voltage of 1.5±0.1 V to a upper limit battery voltage of 2.7±0.1 V, the Li atom abundance ratio $A_{Li}$ is calculated from a peak derived from a Li 1s-orbital that appears in a binding energy region of 52 eV to 58 eV, and the Ti atom abundance ratio $A_{Ti}$ is calculated from a peak derived from a Ti 2p-orbital that appears in a binding energy region of 455 eV to 462 eV;

wherein the negative electrode active material particles have a layer of a lithium titanate having a rock salt structure on at least a part of the surface thereof, and the layer of the lithium titanate having the rock salt structure has a thickness of 5 nm to 50 nm.

2. The negative electrode according to claim 1, wherein the layer of the lithium titanate having the rock salt structure has a thickness of 5 nm to 30 nm.

3. The negative electrode according to claim 1, wherein the negative electrode comprises a negative electrode current collector and a negative electrode mixture layer supported on the negative electrode current collector, the negative electrode mixture layer comprises the negative electrode active material particles, a conductive agent, and a binder, the negative electrode mixture layer has a thickness of $t_A$, and the negative electrode current collector has a thickness of $t_{AC}$, and the thickness $t_A$ and the thickness $t_{AC}$ satisfy the following relationship of $2 \leq t_A/t_{AC} \leq 20$.

4. The negative electrode according to claim 3, wherein $7 \leq t_A/t_{AC} \leq 20$.

5. The negative electrode according to claim 1, which is used for a nonaqueous electrolyte battery.

* * * * *